United States Patent
Yuyama

(10) Patent No.: US 7,961,241 B2
(45) Date of Patent: Jun. 14, 2011

(54) IMAGE CORRECTING APPARATUS, PICKED-UP IMAGE CORRECTING METHOD, AND COMPUTER READABLE RECORDING MEDIUM

(75) Inventor: Masami Yuyama, Oume (JP)

(73) Assignee: Casio Computer Co., Ltd., Tokyo (JP)

( * ) Notice: Subject to any disclaimer, the term of this patent is extended or adjusted under 35 U.S.C. 154(b) by 1078 days.

(21) Appl. No.: 11/686,694

(22) Filed: Mar. 15, 2007

(65) Prior Publication Data

US 2007/0216784 A1 Sep. 20, 2007

(30) Foreign Application Priority Data

Mar. 17, 2006 (JP) ................................. 2006-073624

(51) Int. Cl.
*H04N 5/222* (2006.01)
(52) U.S. Cl. .............................. 348/333.02; 348/333.01
(58) Field of Classification Search ............. 348/333.01, 348/333.02, 333.11, 333.12; 382/289, 291, 382/293
See application file for complete search history.

(56) References Cited

U.S. PATENT DOCUMENTS

| | | | | |
|---|---|---|---|---|
| 6,404,936 B1 * | 6/2002 | Katayama et al. | ............ | 382/283 |
| 6,621,524 B1 * | 9/2003 | Iijima et al. | .................. | 348/584 |
| 6,975,352 B2 * | 12/2005 | Seeger et al. | .............. | 348/218.1 |
| 2002/0118292 A1 * | 8/2002 | Baron | ........................... | 348/335 |
| 2004/0169726 A1 * | 9/2004 | Moustier et al. | ........... | 348/207.1 |
| 2004/0169892 A1 * | 9/2004 | Yoda | ............................. | 358/3.28 |
| 2007/0085925 A1 * | 4/2007 | Schroderus | .............. | 348/333.02 |

FOREIGN PATENT DOCUMENTS

| | | |
|---|---|---|
| JP | 07-079339 A | 3/1995 |
| JP | 2002-010133 A | 1/2002 |
| JP | 2002-271686 A | 9/2002 |
| JP | 2003-296329 A | 10/2003 |
| JP | 2005-143092 A | 6/2005 |

OTHER PUBLICATIONS

Japanese Office Action dated Sep. 8, 2009 and English translation thereof issued in a counterpart Japanese Application No. 2006-073624.

* cited by examiner

*Primary Examiner* — Kelly L Jerabek
(74) *Attorney, Agent, or Firm* — Holtz, Holtz, Goodman & Chick, PC

(57) ABSTRACT

When picking up an image including an object, an imaging apparatus displays the picked-up image on a display unit, and stores the image in a first storage unit. Then, the imaging apparatus performs such control as to extract the contour of an object image in the image stored in the first storage unit, and to display the contour together with the object image on the display unit. A first correction unit then corrects the object image, from which the contour is extracted, into a circular shape, and the corrected object image is stored in a second storage unit.

11 Claims, 9 Drawing Sheets

| ADDRESS | GUIDE DISPLAY | REVISION INFORMATION |
|---|---|---|
| 01 | 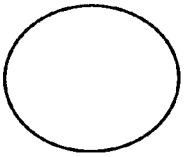 | VERTICAL DIRECTION ENLARGEMENT RATIO : ○○<br>HORIZONTAL DIRECTION ENLARGEMENT RATIO : × × |
| 02 | 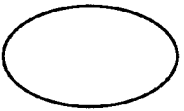 | VERTICAL DIRECTION ENLARGEMENT RATIO : ○○<br>HORIZONTAL DIRECTION ENLARGEMENT RATIO : × × |
| | | |
| 11 | 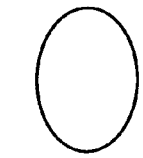 | HORIZONTAL DIRECTION ENLARGEMENT RATIO : △△<br>VERTICAL DIRECTION ENLARGEMENT RATIO : □□ |
| 12 | 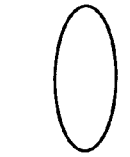 | HORIZONTAL DIRECTION ENLARGEMENT RATIO : △△<br>VERTICAL DIRECTION ENLARGEMENT RATIO : □□ |
| | | |
| 99 | | — |

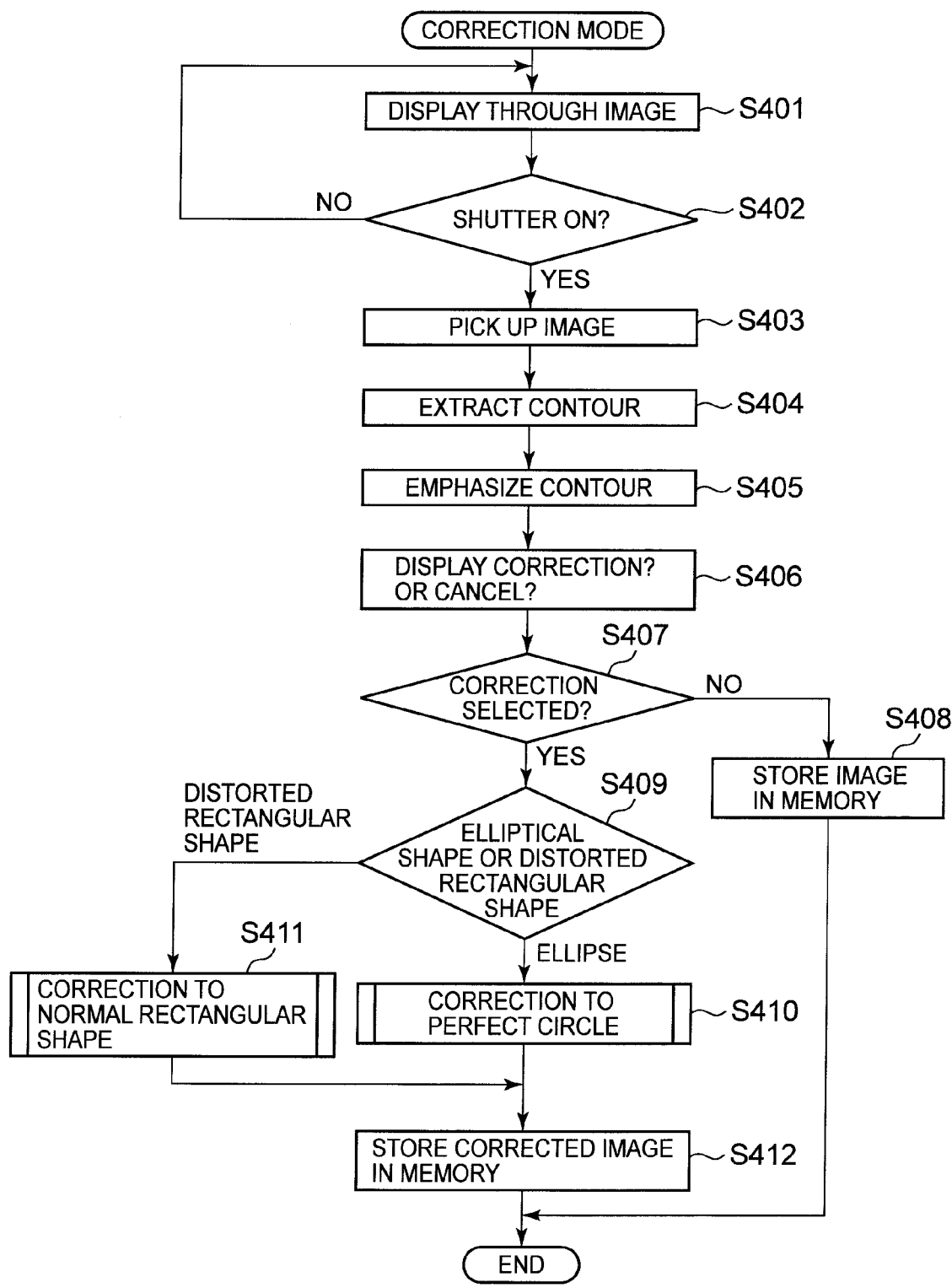

IMAGE CORRECTING APPARATUS, PICKED-UP IMAGE CORRECTING METHOD, AND COMPUTER READABLE RECORDING MEDIUM

BACKGROUND OF THE INVENTION

1. Field of the Invention

The present invention relates to an imaging apparatus, a picked-up image correcting method, and a program product.

2. Description of the Related Art

There is often a case where when a user shoots (images) an object with a digital camera, the shape of the object differs from its original shape depending on the positional relationship and the angle between the digital camera and the object.

For example, when a user shoots a normal rectangular shaped object, the object is imaged into a distorted rectangle due to the angle between the digital camera and the object unless the object is shot from the front.

One solution to the problem is disclosed in, for example, Unexamined Japanese Patent Application KOKAI Publication No. 2005-143092.

According to the publication, when a user shoots a normal rectangular shaped object from an arbitrary angle, the digital camera performs a contour extraction process on the shot image. When it is determined from the contour extraction process that the contour is a distorted rectangle surrounded by four lines, the digital camera corrects the distorted rectangle into a normal rectangle before recording the image.

In this way, the extraction of the contour in the contour extraction process and correction of the distorted rectangle into a normal rectangle, allowing the shape of the object image to be corrected into its original shape even if the object image is shot with a certain angle.

Accordingly, it is an objective of the invention to provide an imaging apparatus, a picked-up image correcting method, and a program product which is able to correct a distorted image of a circular (perfect circle) shaped object that is shot from arbitrary angle, into its original normal shape.

SUMMARY OF THE INVENTION

To achieve the objective, an imaging apparatus according to a first aspect of the invention comprises:

an imaging unit that picks up an image including an object;

a first storage unit that stores the image picked up by the imaging unit;

a display unit that displays an image stored by the first storage unit;

a detection unit that detects a contour of the object image displayed onto the display unit;

a first correction unit that corrects the object image such that the contour detected by the detection unit takes a circular shape; and a second storage unit that stores an object image corrected by the first correction unit.

To achieve the objective, a method of correcting a picked-up image according to a second aspect of the invention comprises:

a first storage step of storing the picked-up image in a first storage unit;

a display step of displaying the picked-up image stored in the first storage step on a display unit;

a detection step of detecting a contour of an object image included in the picked-up image displayed in the display step;

a first correction step of correcting the object image such that the contour detected in the detection step takes a circular shape; and a second storage step of storing the object image corrected in the first correction step in a second storage unit.

To achieve the objective, a program product that is stored on a recording medium according to a third aspect of the invention allows a computer to execute:

a first storage control step of storing a picked-up image in a first storage unit;

a display step of displaying the picked-up image stored in the first storage control step on a display unit;

a detection step of detecting a contour of an object image included in the picked-up image displayed in the display step;

a first correction step of correcting the object image such that the contour detected in the detection step takes a circular shape; and a second storage control step of performing such control as to store the object image corrected in the first correction step in a second storage unit.

BRIEF DESCRIPTION OF THE DRAWINGS

These objects and other objects and advantages of the present invention will become more apparent upon reading of the following detailed description and the accompanying drawings in which:

FIG. 7 is a conceptual diagram of a guide data table in a second embodiment of the invention;

FIG. 9 is a flowchart illustrating process procedures according to a third embodiment of the invention.

DETAILED DESCRIPTION OF THE PREFERRED EMBODIMENTS

First Embodiment

Figure 1:
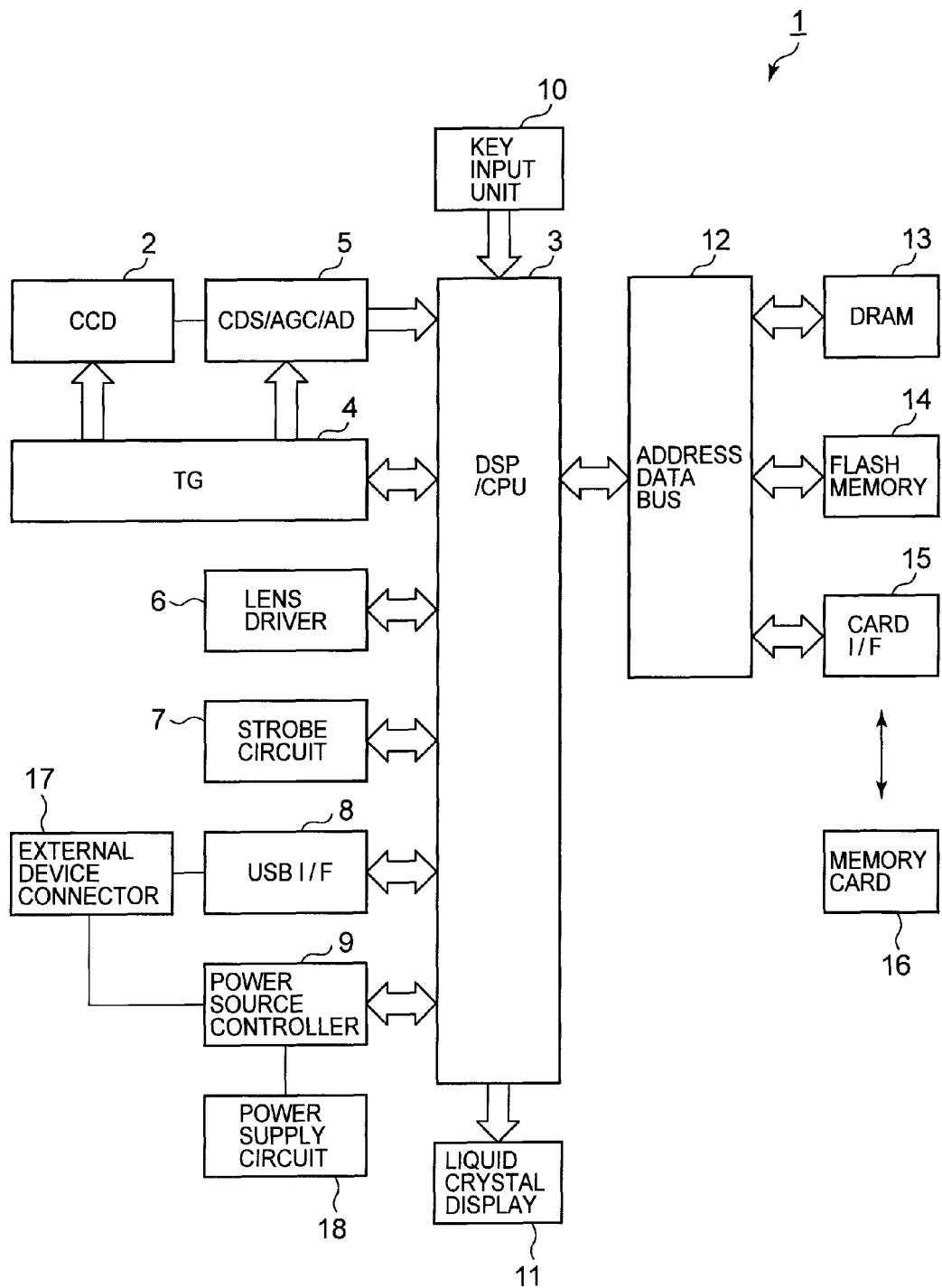
FIG. 1 is a block diagram showing the electric configuration of a digital camera according to a first embodiment of the present invention.

FIG. 1 is a block diagram showing the electric configuration of a digital camera 1 according to one embodiment of the present invention.

The digital camera 1 comprises a CCD 2 which is an imaging device of the invention, and a DSP/CPU 3.

The CCD 2 photoelectrically converts the optical image of an object (not shown) which is formed via an optical system such as lenses. The CCD 2 outputs an analog imaging signal according to the optical image of the object.

The DSP/CPU 3 is a one-chip microcomputer which performs digital signal processing including JPEG format compression/expansion, and controls the individual components of the digital camera 1.

The DSP/CPU 3 is connected with a TG (Timing Generator) 4 which drives the CCD 2.

The TG 4 is connected with a pre-processor 5 to which the imaging signal output from the CCD 2 is provided.

The pre-processor 5 includes a CDS circuit which cancels noise, such as the output signal of the CCD 2 by correlated double sampling, an automatic gain controller (AGC) which amplifies a noise-canceled imaging signal, and an AD converter (AD) which converts the amplified imaging signal to a digital signal. The analog imaging signal output from the CCD 2 is converted into a digital signal by the pre-processor 5, and is then output to the DSP/CPU 3.

The DSP/CPU 3 is connected with a lens driver 6, a strobe circuit 7, a USB interface 8, a power source controller 9, a key input unit 10 and a liquid crystal display 11. A DRAM 13, a flash memory 14 and a card interface 15 are also connected to the DSP/CPU 3 by an address data bus 12.

The card interface 15 is connected with a memory card 16 which is attachable/detachable to/from a card slot (not shown) provided in the main body.

The lens driver 6 includes a motor which drives a zoom lens and a focus lens, and a drive circuit for those lenses. The zoom lens and the focus lens constitute imaging lens. The lens driver 6 drives the zoom lens and the focus lens according to a control signal sent from the DSP/CPU 3.

The DRAM 13 serves as a buffer which temporarily stores image data of the object which is imaged by the CCD 2 and digitized by the pre-processor 5 and the DSP/CPU 3.

The DRAM 13 is used as the working memory of the DSP/CPU 3.

When a user's operation of a shutter key is detected, the DSP/CPU 3 performs a compression and coding process on image data temporarily stored in the DRAM 13 and records the image data as an image file of a predetermined format in the memory card 16.

The strobe circuit 7 includes a light source, such as a xenon lamp, which constitutes the strobe, a power supply circuit which supplies power to the light source, and a light controlling circuit which controls the amount of light of the light source.

The liquid crystal display 11 includes a color LCD and a driver therefor. In record mode, the liquid crystal display 11 displays a picked-up image obtained as a result of sequential imaging done by the CCD 2. In playback mode, the liquid crystal display 11 displays the recorded image read from the memory card 16 which is decompressed by the DSP/CPU 3.

The liquid crystal display 11 displays a process menu at the time of selecting a function, and displays setting figures, icons or the like for assisting the operation.

The lens driver 6 includes a stepping motor and a motor driver. Stepping motor drives those lenses (those lenses include the zoom lens and the focus lens) in the optical axial direction. The motor driver drives the lens group according to a control signal sent from the DSP/CPU 3.

The USB interface 8 is connected with the external device connector 17.

When the digital camera 1 is connected to another external device via the external device connector 17, the digital camera 1 receives an operational signal sent from the external device, and transfers image data recorded in the memory card 16 to the external device.

The power source controller 9 is connected with a power supply circuit 18 including a battery charger of nickel hydrogen or the like. The power source controller 9 supplies power that is externally supplied via the external device connector 17, to the power supply circuit 18.

The key input unit 10 includes a plurality of operation keys, such as a shutter key and a mode select key, and a switch. The key input unit 10 outputs an operational signal according to the user's key operation to the DSP/CPU 3.

Stored in the flash memory 14 are control programs for controlling the individual components, such as an AE (Auto Exposure) control program, an AF (Auto Focus) control program, a data communication program and programs for executing processes, which are to be discussed later. The flash memory 14 also stores various kinds of data.

Figure 2:
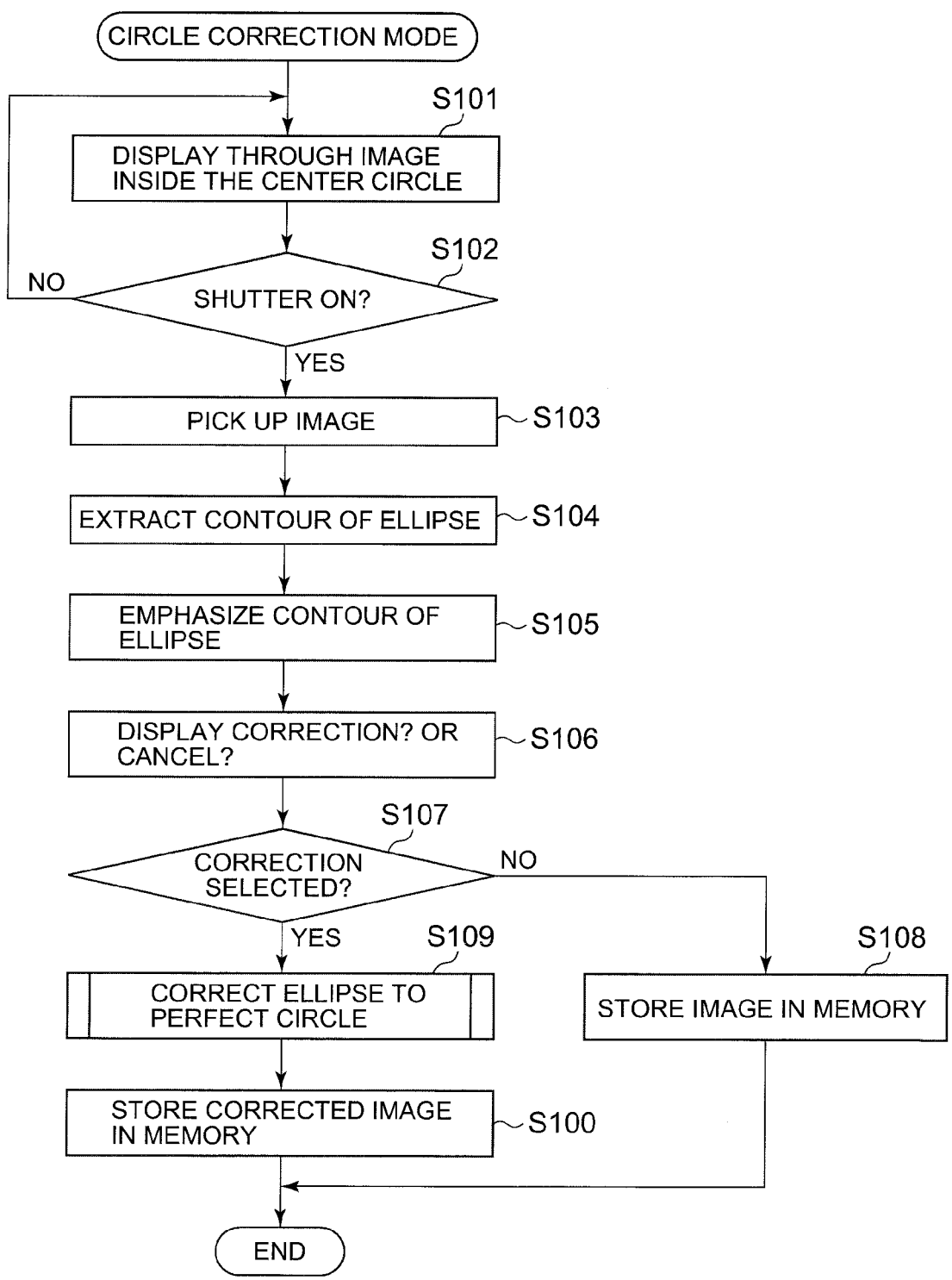
FIG. 2 is a flowchart illustrating process procedures according to the first embodiment of the invention.

With the digital camera 1 having the above-described configuration, when the user operates the mode select key to set record mode, and setting of a circle correction mode is detected by the DSP/CPU 3, the DSP/CPU 3 executes a process as shown in the flowchart of FIG. 2 based on the programs stored in the flash memory 14.

First, a circular display area is shown in the center of the screen displayed on the liquid crystal display 11, and a picked-up image is displayed in this circular display area (step S101).

Figure 3A:
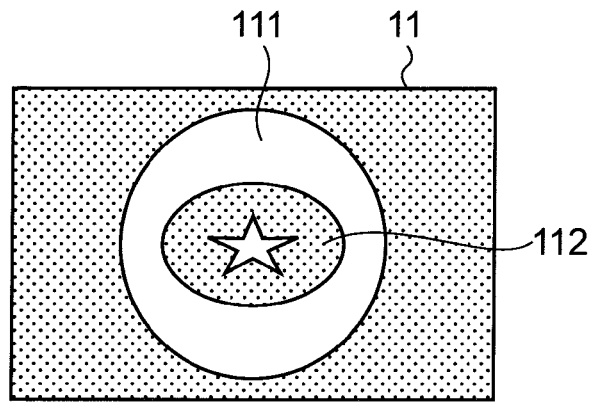
FIG. 3A is a display transition diagram of the first embodiment.

FIG. 3A shows an example of the liquid crystal display 11 displayed in step S101. Specifically, a circular display area 111 is displayed in the center of the screen, and a picked-up image is displayed in the display area 111.

An object image 112 whose original shape is a perfect circle is displayed in the display area 111 in an elliptical shape due to the influence of the angle between the imaging surface of the CCD 2 and the object.

Next, the DSP/CPU 3 determines whether or not the shutter key of the key input unit 10 has been operated (step S102). When having determined that the shutter key has been operated, the DSP/CPU 3 executes a still picture imaging process to acquire still image data, and stores in the DRAM 13 only the portion of the acquired still image data which belongs to the area corresponding to the display area 111 (step S103).

Subsequently, the DSP/CPU 3 executes a process of extracting (detecting) the contour of the ellipse in the still image data stored in the DRAM 13 (step S104).

The contour extraction process employs, for example, a known radon method or the like and extracts the maximum elliptical area present in the image.

Next, the DSP/CPU 3 displays on the liquid crystal display 11, the still image data stored in the DRAM 13 in step S103. The contour of the ellipse extracted in step S104 is also displayed in an emphasized manner (step S105). Further, the DSP/CPU 3 displays a correction index 114 and a cancel index 115 (step S106).

Figure 3B:
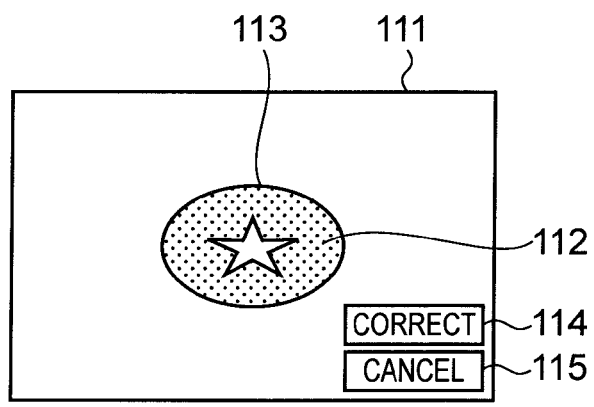
FIG. 3B is a display transition diagram of the first embodiment.

Through the processes in step S105 and S106, as shown in FIG. 3B, the object image 112 with a emphasized contour 113 is displayed on the liquid crystal display 11 with the indexes 114 and 115 being superimposed thereto.

Subsequently, the DSP/CPU 3 determines whether the user has operated the key input unit 10 and has selected either of the indexes 114 or 115 (determines whether the user agrees with executing the correction process or canceling the correction process) (step S107). When the DSP/CPU 3 determines that cancellation of the correction process has been selected (step S107: NO), the DSP/CPU 3 directly stores the object image 112 into the memory card 16 without correcting the shape of the object image 112 to a perfect circle (the correction process to be discussed later) (step S108).

When the DSP/CPU 3 determines that execution of the correction process has been selected (step S107: YES), the DSP/CPU 3 corrects the shape of the object image 112 into a perfect circle (step S109). The DSP/CPU 3 combines the corrected image with a background image with the normal aspect ratio to generate a new still image data and stores the still image data into the memory card 16 (step S110).

Figure 3C:
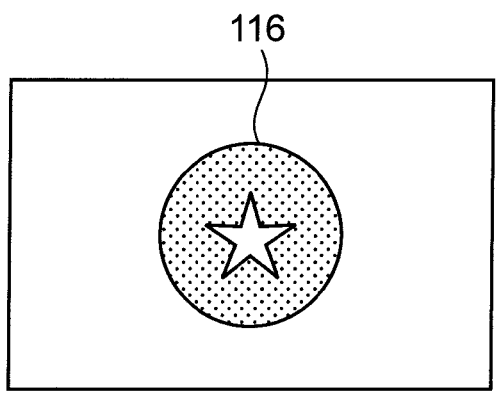
FIG. 3C is a display transition diagram of the first embodiment.

As a result, the image 116 corrected to have a perfect circle is recorded in the memory card 16 as shown in FIG. 3C.

The file format for saving the object image 112 and the image 116 into the memory card 16 is a publicly known computer graphic data format, such as the GIF format or the PNG format. The object image 112 and the image 116 are read from the memory card 16, for example, at the time of executing an image combining process of combining these images with the picked-up image.

A background image with the normal aspect ratio may be prepared beforehand, so that the object image 112 (or the image 116) is combined with the background image, and the resultant image may be recorded in the memory card 16 as an image file with the normal aspect ratio.

Figure 4:
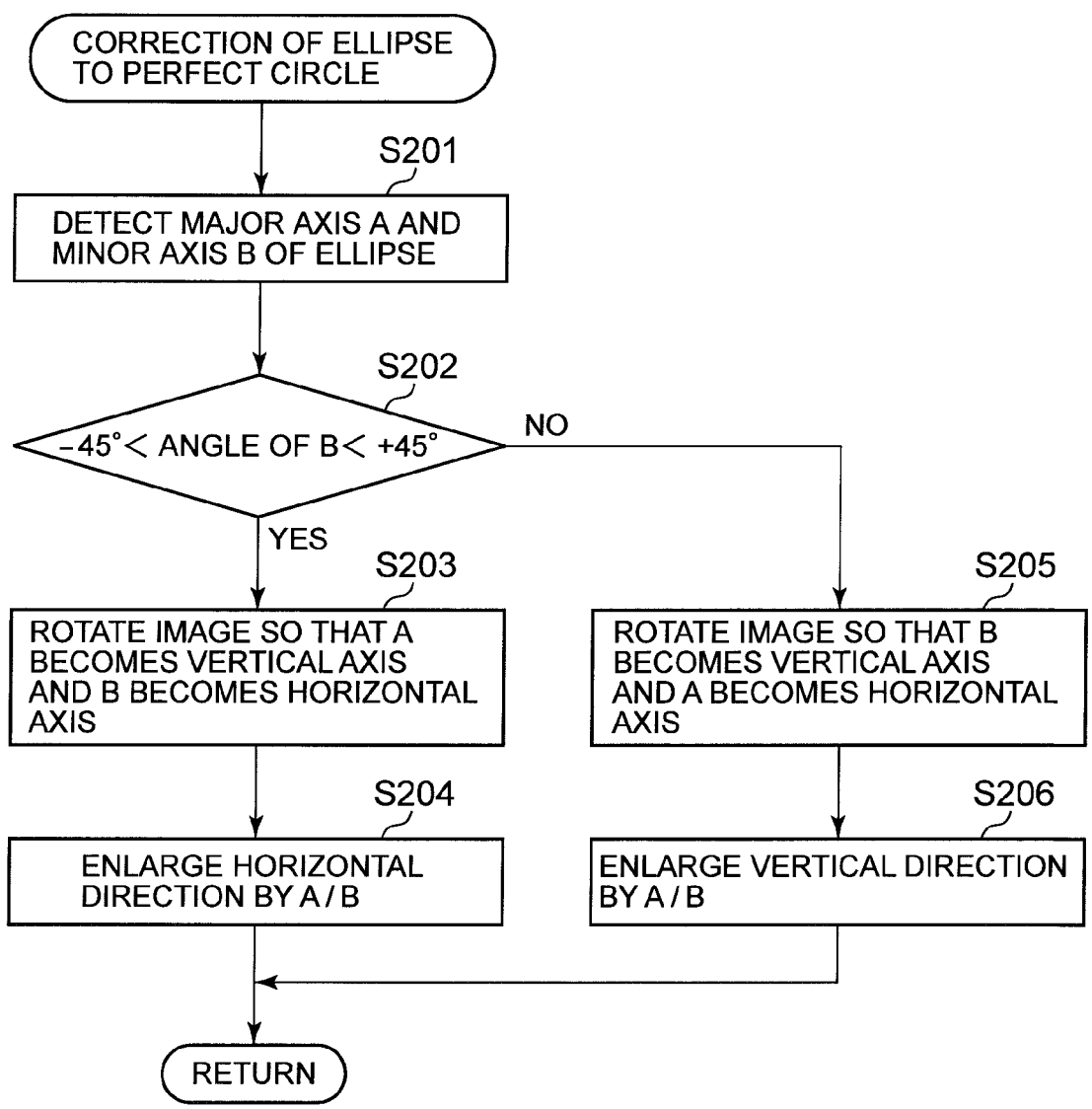
FIG. 4 is a flowchart illustrating process procedures of a process of correcting an ellipse to a perfect circle.

FIG. 4 is a flowchart illustrating process procedures for correcting an ellipse to a perfect circle which is executed in step S109.

First, the DSP/CPU 3 detects a major axis A and a minor axis B of the elliptical object image 112 obtained by the contour extraction in step S104 (step S201).

In order to detect the major axis A and the minor axis B of the elliptical object image 112, for example, the coordinates of each dot on the circumference of the elliptical object image 112 are obtained. Let a line between the farthest coordinates be the major axis A, and let a line between the closest coordinates be the minor axis B.

Next, the DSP/CPU 3 determines whether or not the angle of the detected minor axis B is greater than −45° and smaller than +45° (step S202).

When the decision is YES and −45°<B<+45°, the elliptical object image 112 is rotated in such a way that the major axis A becomes the vertical axis, and the minor axis B becomes the horizontal axis (step S203).

When the decision in step S202 is NO and −45°<B<+45° is not satisfied, the elliptical object image 112 is rotated in such a way that the minor axis B becomes the vertical axis, and the major axis A becomes the horizontal axis (step S205).

The processes in step S203 and step S205 rotate the elliptical object image 112 on the assumption that the elliptical object image 112 whose major axis A or minor axis B does not match with the horizontal axis (x axis) or the vertical axis (y axis) in the two-dimensional coordinate system. That is, the ellipse V (i.e., the elliptical object image 112) is rotated so that the major axis A (or the minor axis B) of the ellipse V is matched with either the horizontal axis (x axis) or the vertical axis (y axis).

Figure 5A:
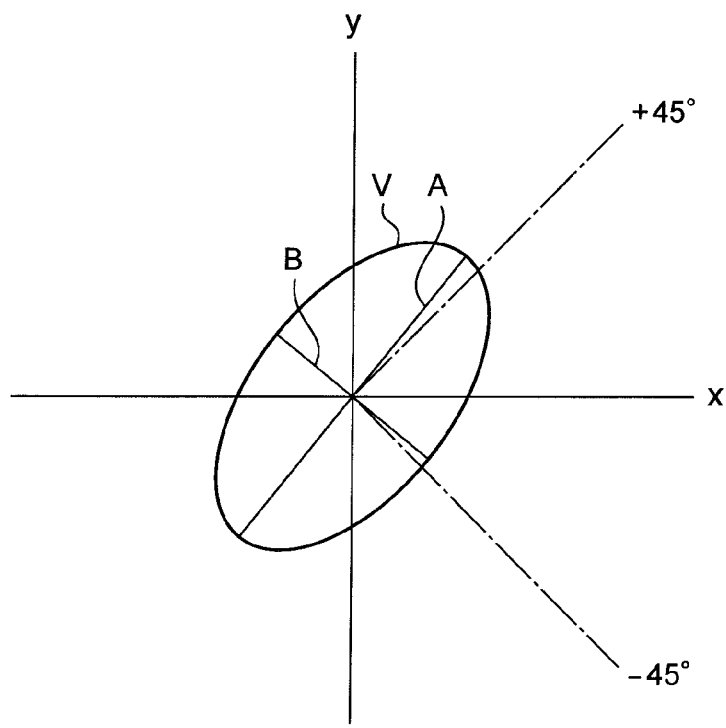
FIG. 5A is an explanatory diagram of step S202.

As shown in FIG. 5A, when the angle of the minor axis B lies within the range of −45° to +45°, matching the minor axis B with the horizontal axis (x axis), rather than with the vertical axis (y axis), requires less rotation of the ellipse V.

Figure 5B:
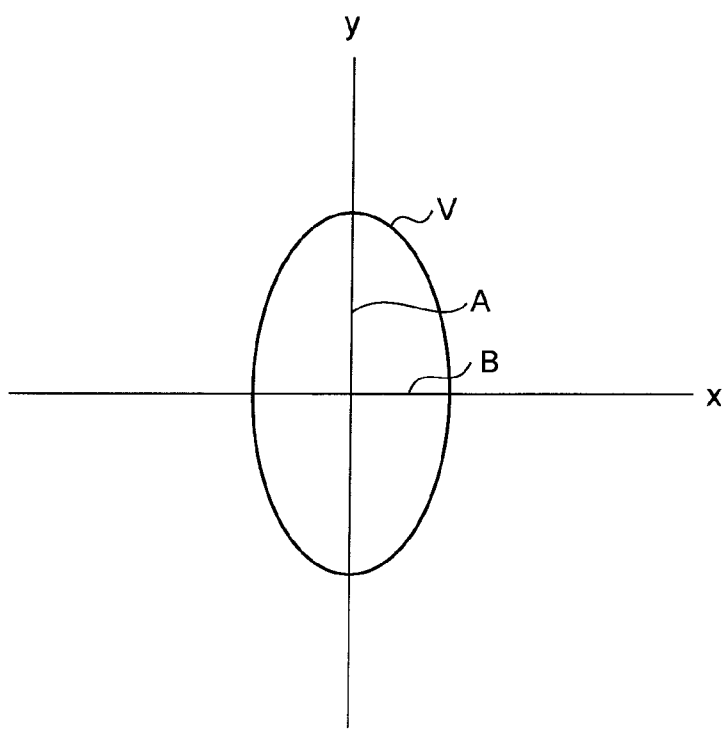
FIG. 5B is an explanatory diagram of step S203.

When the decision in step S202 is YES and the angle of the minor axis B is −45°<B<+45°, therefore, the ellipse V is rotated in such a way that the major axis A becomes the vertical axis, and the minor axis B becomes the horizontal axis in step S203 as shown in FIG. 5B.

When the angle of the minor axis B does not lie within the range of −45° to +45°, on the other hand, matching the minor axis B with the vertical axis (y axis), rather than with the horizontal axis (x axis), requires less rotation of the ellipse V.

Figure 6:
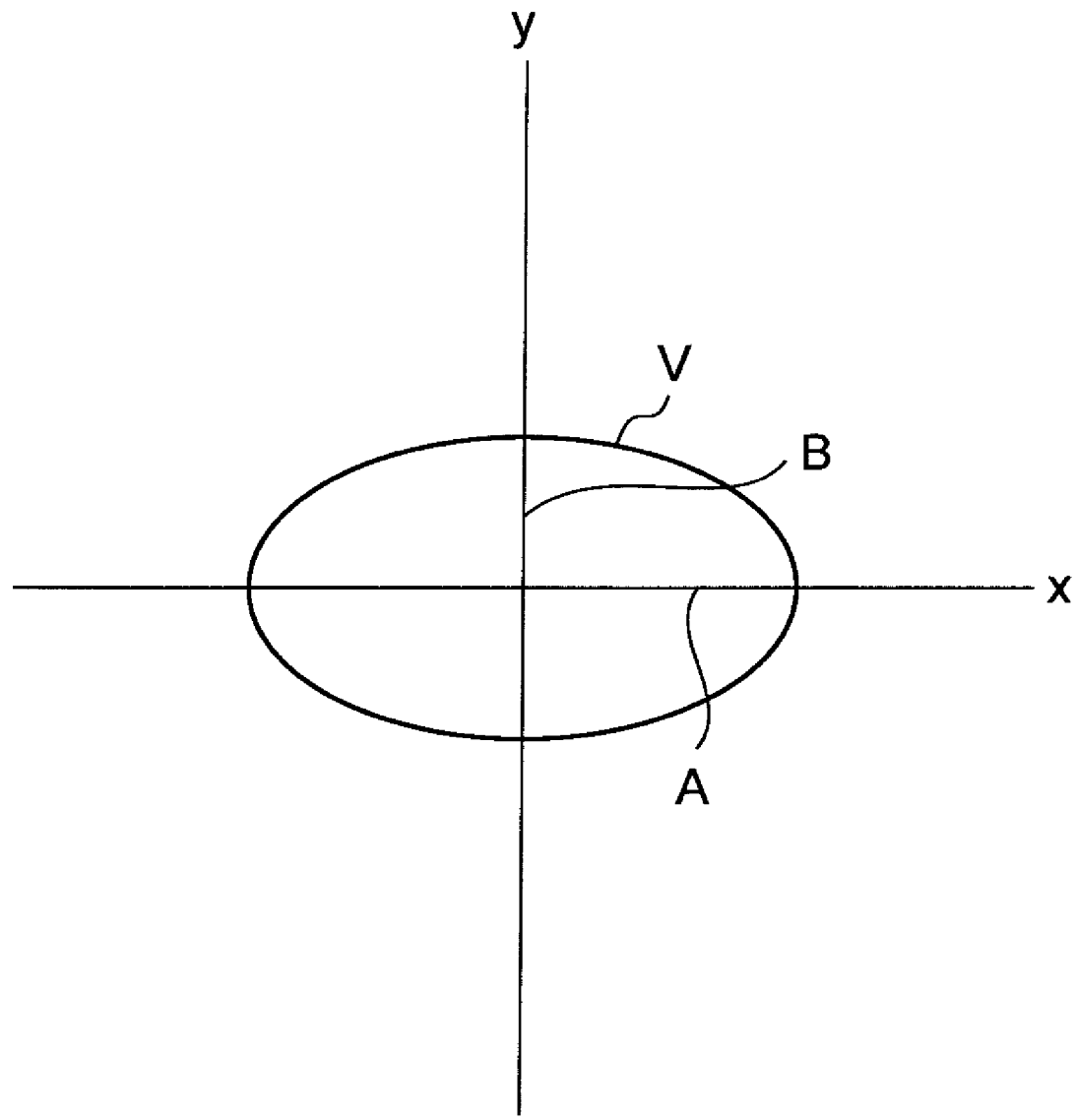
FIG. 6 is an explanatory diagram of step S205.

When the decision in step S202 is NO and the angle of the minor axis B is not −45°<B<+45°, therefore, the ellipse V is rotated in such a way that the minor axis B becomes the vertical axis, and the major axis A becomes the horizontal axis in step S205 as shown in FIG. 6.

When the ellipse V is rotated in such a way that the major axis A becomes the vertical axis (y axis), and minor axis B becomes the horizontal axis (x axis) in step S203, as shown in FIG. 5B, the horizontal direction of the ellipse V is enlarged by A/B (step S204).

Accordingly, A=B is obtained and the major axis A and the minor axis B of the ellipse V become the same length, correcting the elliptical object image 112 into a perfect circle.

When the ellipse V is rotated in such a way that the minor axis B becomes the vertical axis (y axis), and major axis A becomes the horizontal axis (x axis) in step S205, as shown in FIG. 6, the vertical direction of the image is enlarged by A/B (step S206). Accordingly, A=B is obtained and the major axis A and the minor axis B of the ellipse V become the same length. As a result, the elliptical object image 112 is corrected into a perfect circle.

Although the horizontal direction or the vertical direction of the ellipse is enlarged by A/B with the length of the major axis A taken as a reference, the horizontal direction or the vertical direction of the ellipse may be reduced by B/A with the length of the minor axis B taken as a reference.

Further, the major axis A may be reduced and the minor axis B may be enlarged based on the ratio or the like of the difference between the lengths of the major axis A and the minor axis B without taking the length of either axis as a reference. The key is to perform an image correction so that A=B is obtained.

The enlargement or the reduction correction of an image is carried out after the image is rotated as mentioned above in such a way that the major axis A or the minor axis B becomes the horizontal axis (x axis) or the vertical axis (y axis).

Therefore, enlargement or reduction of an image need be executed only in the horizontal (x) direction or the vertical (y) direction of the two-dimensional coordinate system.

This makes the enlargement or reduction correction process simpler, in that an ellipse can be corrected to a perfect circle by a simple enlargement or reduction correction process.

Second Embodiment

Figure 8:
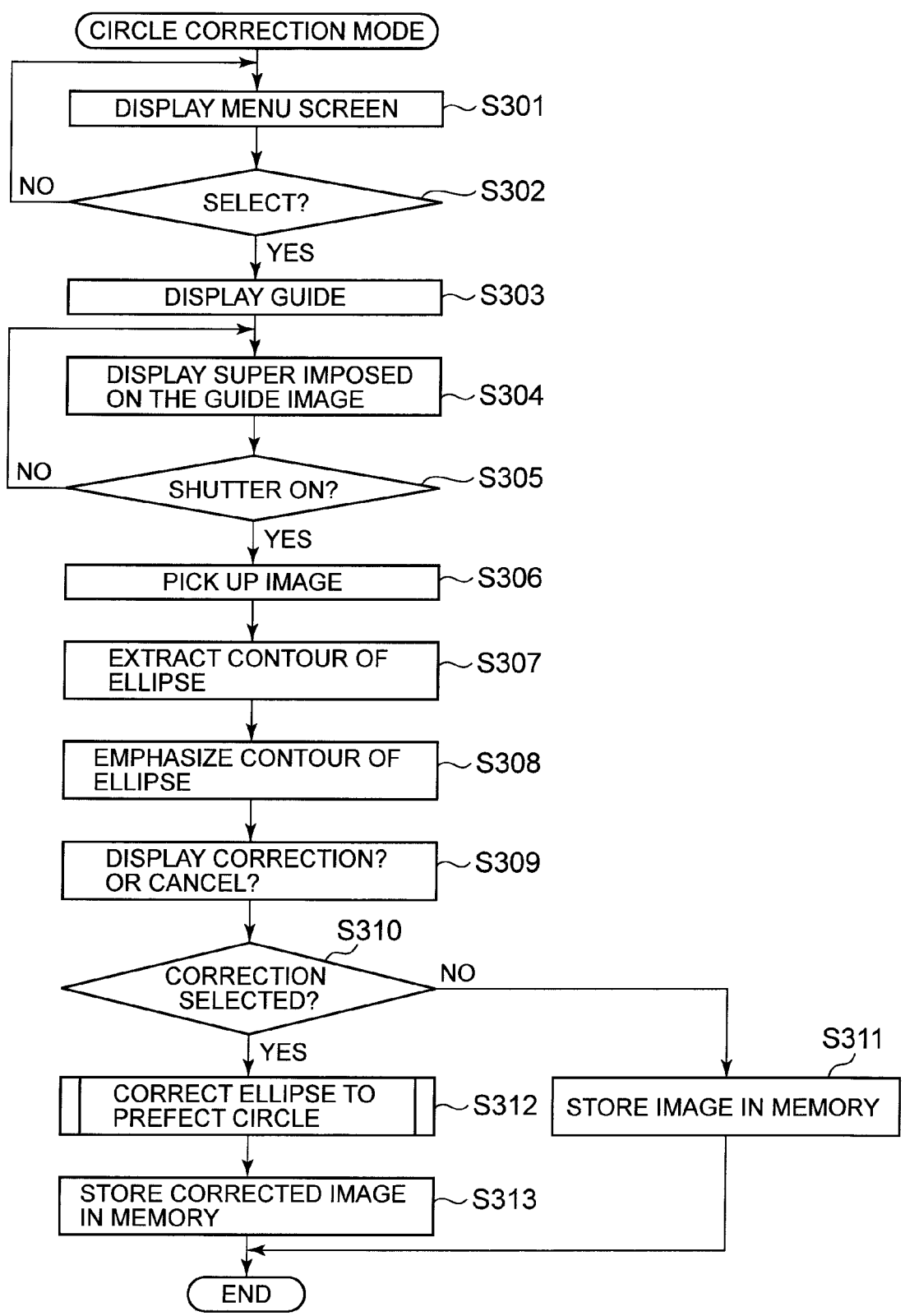
FIG. 8 is a flowchart illustrating process procedures according to the second embodiment.

FIGS. 7 and 8 show a second embodiment of the invention.

In the embodiment, as shown in FIG. 7, the flash memory 14 stores a guide data table 141 in addition to the programs, various kinds of data and the like.

The guide data table 141 stores guide image data and revision information in association with a storage address.

In the guide data table 141, guide image data of a horizontally elongated ellipse close to a perfect circle, and corresponding revision information comprising a vertical direction enlargement (zoom-up) ratio and a horizontal direction reduction (zoom-down) ratio are stored at a storage address 01.

Guide image data of a horizontally elongated ellipse slightly flatter in the horizontal direction than the guide image data stored at the storage address 01, and corresponding revision information comprising a vertical direction enlargement ratio and the horizontal direction reduction ratio is stored at a storage address 02.

Guide image data of a vertically elongated ellipse close to a perfect circle, and corresponding revision information comprising a vertical direction enlargement ratio and a horizontal direction reduction ratio is stored at a storage address 11.

Guide image data of a vertically elongated ellipse slightly flatter in the vertical direction than the guide image data stored at the storage address 11, and corresponding revision information comprising a vertical direction enlargement ratio and a horizontal direction reduction ratio is stored at a storage address 12.

At a storage address 99, coordinate image data consisting of the horizontal axis (x axis) and vertical axis (y axis) is stored, but corresponding revision information is not stored.

FIG. 8 is a flowchart illustrating process procedures according to the second embodiment.

First, upon detection of a predetermined operation by the user, the DSP/CPU 3 executes a menu screen display process and displays small scaled images of plurality of the guide image data stored in the guide data table 141 on the liquid crystal display 11 (step S301).

Next, the DSP/CPU 3 determines whether or not a guide image data is selected from the menu screen by the user operating the key input unit 10 (step S302). When having determined that guide image data is selected, the DSP/CPU 3 displays the selected guide image data on the liquid crystal display 11 in the center (step S303).

Further, the DSP/CPU 3 displays, on the liquid crystal display 11, picked-up images obtained by sequential imaging by the CCD 2, superimposed on the guide image (step S304).

In steps S303 and S304, only the contour line of the guide image is displayed on the liquid crystal display 11 and in the outside and inside of the guide image, the picked-up images are sequentially displayed.

The picked-up image of the outside portion of the guide image may be displayed semitransparently, or may not be displayed at all as described in the foregoing description of the first embodiment.

By referring to the guide image and the picked-up image that are displayed superimposed on one another in step S304, the user adjusts the image pickup angle between the digital camera 1 and the object and the zoom ratio of the digital camera 1 in such a way that the shape of the guide image overlies the periphery of the object image with the elliptical shape included in the picked-up image.

When the user selects the guide image data at the storage address 99, the DSP/CPU 3 displays on the liquid crystal display 11, the coordinate image consisting of the horizontal axis (x axis) and vertical axis (y axis) superimposed on the elliptical shaped object image in place of the guide image.

In this case, the user adjusts the rotational angles of the digital camera 1 and the object in such a way that the major axis directions or the minor axis directions of the shape of the guide image and the elliptical object image included in the picked-up image match with the coordinate axis image.

Subsequently, the DSP/CPU 3 executes steps S305 to S313.

While the processes of steps S305 to S313 are similar to the processes of steps S102 to S110 in the flowchart shown in FIG. 2 in the first embodiment, the DSP/CPU 3 skips steps S201 to S203 and step S205 in the flowchart of FIG. 4 (corresponding to the process of correcting an ellipse to a perfect circle (step S109)) when the user selects a guide image data other than the one stored at the storage address 99.

When the guide image data other than the one stored at the storage address 99 is displayed superimposed on the picked-up image, the user adjusts the rotational angles of the digital camera 1 and the object in such a way that the shape of the guide image overlies the periphery of the object image with the elliptical shape included in the picked-up image. Accordingly, the DSP/CPU 3 need not perform the process of detecting the minor axis direction of the object image (step S201), the process of determining the rotational direction and rotational angle of the minor axis direction (step S202), and the process of rotating the object image (steps S203, S205). The DSP/CPU 3 corrects the ellipse to a perfect circle by performing the horizontal enlargement/reduction process (step S204) and the vertical enlargement/reduction process (step S206) according to the revision information stored in association with the guide image (guide image data).

When the user selects the guide image at the storage address 99, the DSP/CPU 3 skips steps S202, S203 and S205 in the flowchart of FIG. 4 corresponding to the process of step S110.

When the coordinate axis image stored at the storage address 99 is displayed superimposed on the picked-up image, the user adjusts the rotational angles of the digital camera 1 and the object in such a way that the major axis directions or the minor axis directions of the shape of the guide image and the elliptical object image included in the picked-up image match with the coordinate axis image. Accordingly, the DSP/CPU 3 need not perform the process of determining the rotational direction and rotational angle of the minor axis direction of the object image (step S202). After detecting the major axis A and the minor axis B of the ellipse (step S201), the DSP/CPU 3 performs the horizontal enlargement/reduction process (step S204) and the vertical enlargement/reduction process (step S206) according to the coordinate axis image to correct the ellipse to a perfect circle.

The second embodiment can simplify the process of correcting the ellipse to a perfect circle disclosed in the first embodiment, relieve the process load of the DSP/CPU 3 and improve the processing speed.

Third Embodiment

FIG. 9 is a flowchart illustrating process procedures according to a third embodiment of the invention.

When the user sets the correction mode by operating the mode select key provided at the key input unit 10, the DSP/CPU 3 performs processes shown in the flowchart of FIG. 9 based on the programs stored in the flash memory 14 upon detection of the setting operation.

First, the DSP/CPU 3 displays a picked-up image obtained by sequential imaging done by the CCD 2 on the liquid crystal display 11 (step S401).

Next, the DSP/CPU 3 determines whether the user has operated the shutter key or not (step S402). When the DSP/CPU 3 determines that the user has operated the shutter key, the DSP/CPU 3 performs a still image pickup process to acquire still image data, and stores the acquired still image data in the DRAM 13 (step S403).

Subsequently, the DSP/CPU 3 extracts (detects) the contour of the object image included in the image data stored in the DRAM 13 (step S404).

In the contour extraction process, the known radon method or the like is used to extract a maximum elliptical area present in the image.

Next, the DSP/CPU 3 displays the still image data stored in the DRAM 13 on the liquid crystal display 11 in step S403, and emphasizes the contour portion extracted in step S404 (step S405). Further, the DSP/CPU 3 displays the correction index 114 and the cancellation index 115 on the still image (step S406).

Subsequently, the DSP/CPU 3 determines whether the user has operated the key input unit 10 to select execution of the correction process or the cancellation thereof (step S407). When the DSP/CPU 3 determines that cancellation of the correction process has been selected (step S407: NO), the DSP/CPU 3 directly stores the image (still image data stored in the DRAM 13) into the memory card 16 (step S408).

When the DSP/CPU 3 determines that execution of the correction process has been selected (step S407: YES), the DSP/CPU 3 determines whether the contour of the object image extracted in step S404 is an elliptical shape or a distorted rectangular shape (step S409).

When having determined that the contour of the object image is an elliptical shape, the DSP/CPU 3 performs the process of correcting the object image to a perfect circle as has been described in detail in the foregoing description of the first embodiment (step S409).

When having determined that the contour of the object image is a distorted rectangular shape, the DSP/CPU 3 performs the process of correcting the object image to a normal rectangular shape (step S411).

The DSP/CPU 3 stores the corrected image into the memory card 16 (step S412).

According to the third embodiment, as apparent from the above, even if an object originally having a perfect circle shape and an object originally having a normal rectangular shape are shot from different angles with the digital camera 1, the object image can be corrected to the original shape before being recorded.

According to the embodiment, the record mode is set by the user's operation and the process of correcting the object image to a perfect circle is performed upon detection of the setting of the circle correction mode. In addition, image data stored in the memory card 16 may be read out upon detection of the setting of the playback mode, and when an image based on the image data is displayed on the liquid crystal display 11, the process of correcting the object image included in the image to a perfect circle may be executed.

Although the invention is adapted to a single digital camera in the embodiments, the invention can be adapted to devices equipped with a digital camera, such as a cellular phone with a built-in digital camera.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2006-73624 filed on Mar. 17, 2006 and including specification, claims, drawings and summary. The disclosure of the above Japanese Patent Application is incorporated herein by reference in its entirety.

What is claimed is:

1. An imaging apparatus comprising:
   an imaging unit that picks up an image including an object image;
   a first storage unit that stores the image picked up by the imaging unit;
   a display unit that displays the image stored by the first storage unit;
   a first display control unit that performs control to superimpose and display a circular guide, which corresponds to a shape of a contour of the object image after correction, on the image displayed on the display unit;
   a detection unit that detects the contour of the object image displayed on the display unit;
   a first correction unit that corrects the object image such that a shape of the contour detected by the detection unit takes a circular shape based on the circular guide displayed by the first display control unit;
   a second storage unit that stores the object image corrected by the first correction unit;
   a revision-information storage unit that stores, in association with each other, a plurality of guides and corresponding revision information for correcting the object image;
   a guide selecting unit that selects a specific guide from the plurality of guides stored in the revision-information storage unit; and
   a reading unit that reads out the revision information corresponding to the guide selected by the guide selecting unit from the revision-information storage unit,
   wherein the display unit also displays the guide selected by the guide selecting unit,
   wherein the plurality of guides include plural types of elliptical images,
   wherein the revision information stored in the revision-information storage unit in association with the guides includes magnification information for performing enlargement correction or reduction correction in at least one of a major-axial direction and a minor-axial direction, for correcting the elliptical images to circular shapes, and
   wherein the first correction unit corrects the object image according to the magnification information read by the reading unit.

2. The imaging apparatus according to claim 1, further comprising:
   a second display control unit that performs control to read out and display on the display unit, the plurality of guides stored in the revision-information storage unit,
   wherein the guide selecting unit selects the specific guide from the plurality of guides read by the second display control unit.

3. The imaging apparatus according to claim 1, further comprising:
   a selection unit that selects between execution of correction with the first correction unit or cancellation of correction; and
   a storage control unit that performs control to execute correction with the first correction unit when execution of correction is selected by the selection unit, and to store the object image included in the picked up image in the second storage unit when cancellation of correction is selected by the selection unit.

4. The imaging apparatus according to claim 3, wherein the display unit displays at least one of a correction index and a cancellation index together with the object image whose contour is detected, and
   wherein the selection unit selects either correction with the first correction unit or cancellation in accordance with a detected instruction to one of the correction index and the cancellation index.

5. An imaging apparatus comprising:
   an imaging unit that picks up an image including an object image;
   a first storage unit that stores the image picked up by the imaging unit;
   a display unit that displays the image stored by the first storage unit;
   a first display control unit that performs control to superimpose and display a circular guide, which corresponds to a shape of a contour of the object image after correction, on the image displayed on the display unit;
   a detection unit that detects the contour of the object image displayed on the display unit;

a first correction unit that corrects the object image such that a shape of the contour detected by the detection unit takes a circular shape based on the circular guide displayed by the first display control unit;

a second storage unit that stores the object image corrected by the first correction unit;

a revision-information storage unit that stores, in association with each other, a plurality of guides and corresponding revision information for correcting the object image;

a guide selecting unit that selects a specific guide from the plurality of guides stored in the revision-information storage unit; and a reading unit that reads out the revision information corresponding to the guide selected by the guide selecting unit from the revision-information storage unit, wherein the display unit also displays the guide selected by the guide selecting unit, and the first correction unit corrects the object image according to the revision information read by the reading unit, wherein the guides include an elliptical image and a coordinate axis image, wherein the revision information stored in association with the elliptical image includes magnification information for performing enlargement correction or reduction correction in at least one of a major-axial direction and a minor-axial direction for correcting the elliptical image to a circular shape, and wherein the first correction unit comprises:
- a second correction unit that corrects the object image to a circular shape according to the magnification information associated with the elliptical image when the elliptical image is selected by the guide selecting unit; and
- a third correction unit that corrects the object image whose major-axial direction or minor-axial direction matches with a coordinate axis of the coordinate axis image when the coordinate axis image is selected by the guide selecting unit.

6. A method of correcting a picked-up image including an object image, comprising:

storing the picked-up image in a first storage unit;

displaying the picked-up image stored in the first storage unit on a display unit;

superimposing and displaying a circular guide, which corresponds to a shape of a contour of the object image after correction, on the picked-up image displayed on the display unit;

detecting the contour of the object image included in the picked-up image displayed on the display unit;

correcting the object image such that a shape of the detected contour takes a circular shape based on the displayed circular guide;

storing the corrected object image in a second storage unit;

selecting a specific guide from a revision-information storage memory that stores, in association with each other, a plurality of guides and corresponding revision information for correcting the object image;

reading out the revision information corresponding to the selected guide; and also displaying the selected guide, wherein the plurality of guides include plural types of elliptical images, wherein the revision information stored in the revision-information storage memory in association with the guides includes magnification information for performing enlargement correction or reduction correction in at least one of a major-axial direction and a minor-axial direction, for correcting the elliptical images to circular shapes, and wherein the object image is corrected according to the magnification information included in the read revision information.

7. The method according to claim 6, further comprising:

selecting execution of the correcting or cancellation of the correcting; and executing the correcting when execution of the correcting is selected, and storing the object image included in the picked up image in the second storage unit when cancellation of the correcting is selected.

8. A non-transitory computer readable recording medium having a computer program stored thereon that is executable by a computer to control the computer to execute functions comprising:

storing a picked-up image including an object image in a first storage unit;

displaying the picked-up image stored in the first storage unit on a display unit;

superimposing and displaying a circular guide, which corresponds to a shape of a contour of the object image after correction, on the picked-up image displayed on the display unit;

detecting the contour of the object image included in the picked-up image displayed on the display unit;

correcting the object image such that a shape of the detected contour takes a circular shape based on the displayed circular guide;

storing the corrected object image in a second storage unit;

selecting a specific guide from a revision-information storage unit that stores, in association with each other, a plurality of guides and corresponding revision information for correcting the object image; and reading out the revision information corresponding to the selected guide from the revision-information storage unit; and also displaying the selected guide, wherein the plurality of guides include plural types of elliptical images, wherein the revision information stored in the revision-information storage unit in association with the guides includes magnification information for performing enlargement correction or reduction correction in at least one of a major-axial direction and a minor-axial direction, for correcting the elliptical images to circular shapes, and wherein the object image is corrected according to the magnification information included in the read revision information.

9. The computer readable recording medium according to claim 8, wherein the functions further comprise:

selecting execution of the correcting or cancellation of the correcting; and executing the correcting when execution of the correcting is selected, and storing the object image included in the picked up image in the second storage unit when cancellation of the correcting is selected.

10. A method of correcting a picked-up image including an object image, comprising:

storing the picked-up image in a first storage unit;

displaying the picked-up image stored in the first storage unit on a display unit;

superimposing and displaying a circular guide, which corresponds to a shape of a contour of the object image after correction, on the picked-up image displayed on the display unit;
detecting the contour of the object image included in the picked-up image displayed on the display unit;
correcting the object image such that a shape of the detected contour takes a circular shape based on the displayed circular guide;
storing the corrected object image in a second storage unit;
selecting a specific guide from a revision-information storage memory that stores, in association with each other, a plurality of guides and corresponding revision information for correcting the object image;
reading out the revision information corresponding to the selected guide; and
also displaying the selected guide,
wherein the guides include an elliptical image and a coordinate axis image,
wherein the revision information stored in association with the elliptical image includes magnification information for performing enlargement correction or reduction correction in at least one of a major-axial direction and a minor-axial direction for correcting the elliptical image to a circular shape, and
wherein correcting the object image unit comprises:
correcting the object image to a circular shape according to the magnification information associated with the elliptical image when the elliptical image is selected by the guide selecting unit; and
correcting the object image whose major-axial direction or minor-axial direction matches with a coordinate axis of the coordinate axis image when the coordinate axis image is selected by the guide selecting unit.

11. A non-transitory computer readable recording medium having a computer program stored thereon that is executable by a computer to control the computer to execute functions comprising:
storing a picked-up image including an object image in a first storage unit;
displaying the picked-up image stored in the first storage unit on a display unit;
superimposing and displaying a circular guide, which corresponds to a shape of a contour of the object image after correction, on the picked-up image displayed on the display unit;
detecting the contour of the object image included in the picked-up image displayed on the display unit;
correcting the object image such that a shape of the detected contour takes a circular shape based on the displayed circular guide;
storing the corrected object image in a second storage unit;
selecting a specific guide from a revision-information storage unit that stores, in association with each other, a plurality of guides and corresponding revision information for correcting the object image; and
reading out the revision information corresponding to the selected guide from the revision-information storage unit; and
also displaying the selected guide,
wherein the guides include an elliptical image and a coordinate axis image,
wherein the revision information stored in association with the elliptical image includes magnification information for performing enlargement correction or reduction correction in at least one of a major-axial direction and a minor-axial direction for correcting the elliptical image to a circular shape, and
wherein correcting the object image unit comprises:
correcting the object image to a circular shape according to the magnification information associated with the elliptical image when the elliptical image is selected by the guide selecting unit; and
correcting the object image whose major-axial direction or minor-axial direction matches with a coordinate axis of the coordinate axis image when the coordinate axis image is selected by the guide selecting unit.

* * * * *